US012632255B2

(12) United States Patent
Kumar et al.

(10) Patent No.: US 12,632,255 B2
(45) Date of Patent: May 19, 2026

(54) RESERVATION STATION WITH MULTIPLE ENTRY TYPES

(71) Applicant: Apple Inc., Cupertino, CA (US)

(72) Inventors: Amit Kumar, Fremont, CA (US); Deepankar Duggal, Sunnyvale, CA (US); Haoyan Jia, Clarksville, MD (US); Manjunath Shevgoor, Beaverton, OR (US); Mridul Agarwal, Saratoga, CA (US); Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 18/742,976

(22) Filed: Jun. 13, 2024

(65) Prior Publication Data

US 2025/0258670 A1 Aug. 14, 2025

Related U.S. Application Data

(60) Provisional application No. 63/553,120, filed on Feb. 13, 2024.

(51) Int. Cl.
*G06F 9/30* (2018.01)

(52) U.S. Cl.
CPC .................................. *G06F 9/30043* (2013.01)

(58) Field of Classification Search
CPC .. G06F 9/30043; G06F 9/3814; G06F 9/3836; G06F 9/3838; G06F 9/384; G06F 9/3856
See application file for complete search history.

(56) References Cited

U.S. PATENT DOCUMENTS

| 4,991,090 | A | * | 2/1991 | Emma | G06F 9/3802 |
|---|---|---|---|---|---|
| | | | | | 712/E9.055 |
| 5,712,997 | A | * | 1/1998 | Dice | G06F 9/3865 |
| | | | | | 712/216 |
| 6,223,275 | B1 | * | 4/2001 | Goto | G06F 9/30101 |
| | | | | | 712/201 |
| 10,228,951 | B1 | * | 3/2019 | Kothari | G06F 9/30043 |
| 10,452,434 | B1 | | 10/2019 | Blasco et al. | |
| 11,126,438 | B2 | | 9/2021 | Srinivasan et al. | |
| 2009/0037698 | A1 | * | 2/2009 | Nguyen | G06F 9/3016 |
| | | | | | 712/217 |
| 2013/0151816 | A1 | * | 6/2013 | Indukuru | G06F 9/3854 |
| | | | | | 712/206 |
| 2014/0189328 | A1 | * | 7/2014 | Weiner | G06F 1/3243 |
| | | | | | 712/228 |
| 2021/0318905 | A1 | * | 10/2021 | Priyadarshi | G06F 9/30101 |
| 2022/0100501 | A1 | * | 3/2022 | Boyer | G06F 9/22 |

* cited by examiner

Primary Examiner — Jyoti Mehta
Assistant Examiner — Kasim Alli
(74) *Attorney, Agent, or Firm* — DICKINSON WRIGHT RLLP

(57) ABSTRACT

A reservation station that includes a storage circuit with multiple full and partial entries is disclosed. A given store-data entry of the multiple partial entries may store less data than a given full entry of the multiple full entries. A control circuit may receive a load/store operation and, in response to a determination that the load/store operation includes only a single source, store the load/store operation in a particular partial entry of the multiple partial entries.

20 Claims, 15 Drawing Sheets

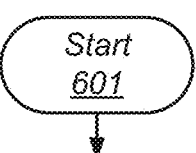

Start
601

Storing a plurality of load/store operations in corresponding entries of a plurality of full entries included in a primary storage circuit included in a reservation station
602

Transferring, by the reservation station, a particular store operation from a particular full entry of the plurality of full entries to a particular store-date entry of a plurality of store-data entries included in a secondary storage circuit included in the reservation station, wherein a given store-data entry of the plurality of store-data entries is configured to store a subset of information included in a given full entry of the plurality of full entries
603

End
604

*FIG. 6*

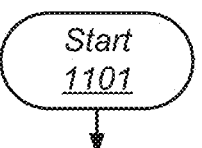

*Start*
*1101*

*Receiving, by a reservation station, a first load/store operation, wherein the reservation station includes a storage circuit including a plurality of full entries and a plurality of partial entries, wherein a given full entry of the plurality of full entries is configured to store a first amount of data, and wherein a given partial entry of the plurality of partial entries is configured to store a second amount of data less than the first amount of data*
*1102*

*Checking, by the reservation station, first characteristics of the first load/store operation*
*1103*

*Storing, by the reservation station, the first load/ store operation in a particular partial entry of the plurality of partial entries in response to determining that the first load/store operation includes only a single source*
*1104*

*End*
*1105*

*FIG. 11*

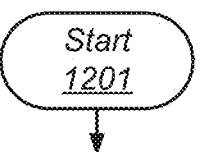

*Receiving, by a reservation station, a first load/store operation, wherein the reservation station includes a storage circuit including a plurality of primary entries and a plurality of secondary entries, wherein a given primary entry of the plurality of primary entries is configured to store a first amount of data, and wherein a given secondary entry of the plurality of secondary entries is configured to store a second amount of data less than the first amount of data*
*1202*

*Checking, by the reservation station, first characteristics of the first load/store operation*
*1203*

*Storing, by the reservation station, the first load/ store operation in a particular secondary entry of the plurality of secondary entries in response to determining that the first load/store operation includes is a single-source load operation*
*1204*

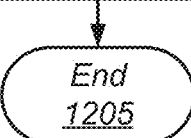

*FIG. 12*

RESERVATION STATION WITH MULTIPLE ENTRY TYPES

CROSS-REFERENCE TO RELATED APPLICATIONS

The present application claims the benefit of U.S. Provisional Application No. 63/553,120, entitled "RESERVATION STATION WITH MULTIPLE ENTRY TYPES," filed Feb. 13, 2024, the content of which is incorporated by reference herein in its entirety for all purposes.

FIELD

The described embodiments relate generally to integrated circuits and, more particularly, to reservation stations included in processor circuits.

BACKGROUND

Computer systems can include one or more processor circuits that execute software or program instructions to perform certain tasks. The software or program instructions can be stored in a memory circuit until needed. Prior to executing a given software or program instruction, the processor circuit may retrieve or fetch the given software or program instruction from the memory circuit.

In some processor circuits, fetched instructions are stored in a reservation circuit which schedules the execution of fetched instructions by an execution unit or circuit. In some cases, a processor circuit may include multiple reservation stations for different types of instructions. Such reservation stations may be connected to respective execution units or circuits.

BRIEF DESCRIPTION OF THE DRAWINGS

FIG. 6 is a flow diagram depicting an embodiment of a method for transferring store operations between a primary storage circuit and a secondary storage circuit in a reservation station.

FIG. 11 is a flow diagram of an embodiment of a method for operating a reservation station that includes multiple types of entries.

FIG. 12 is a flow diagram of an embodiment of a different method for operating a reservation station that includes multiple types of entries.

DETAILED DESCRIPTION

Figure 1:
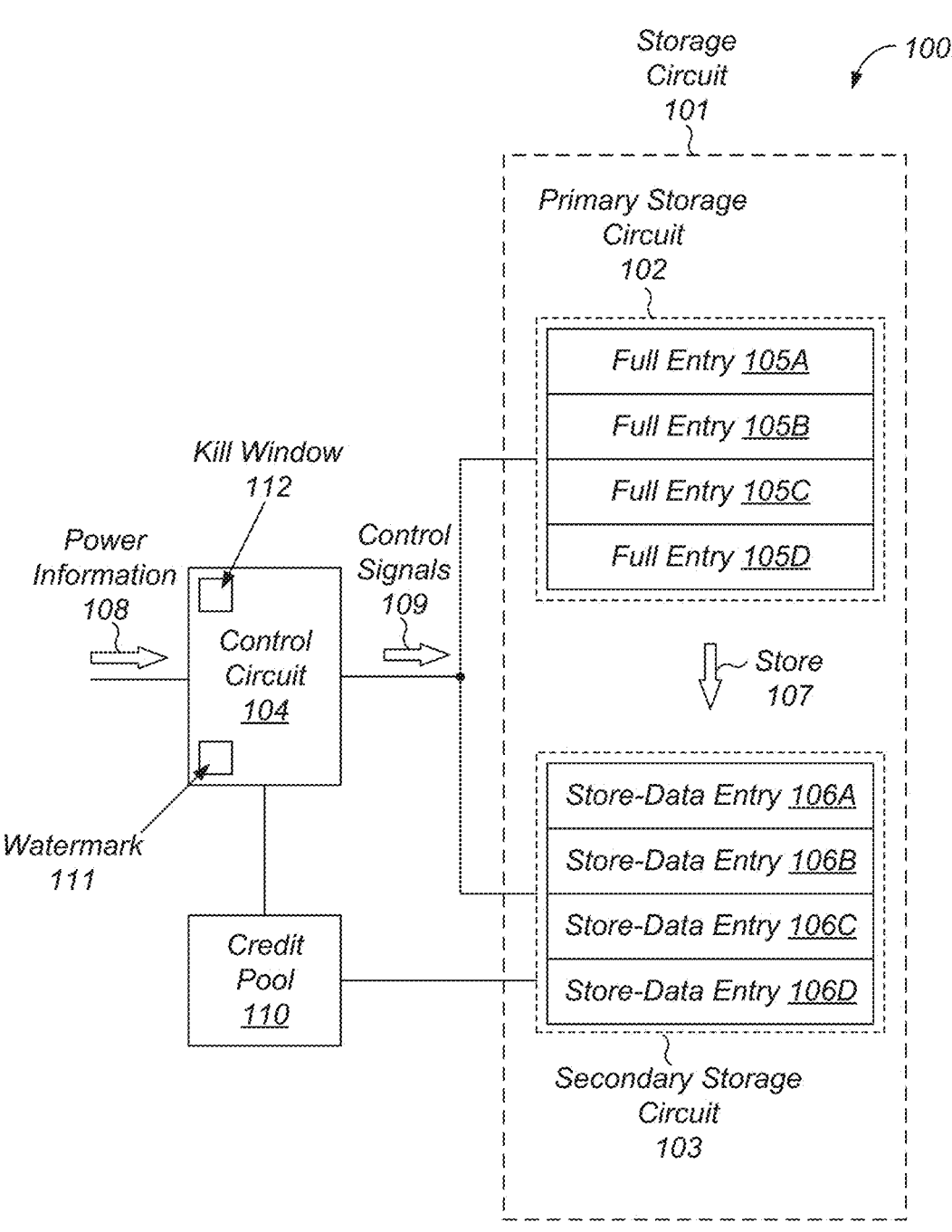
FIG. 1 is a block diagram depicting an embodiment of a reservation station.

Computer systems may include one or more processor circuits to execute software or program instructions. As a processor circuit fetches such instructions from a memory circuit, not all of the fetched instructions can be immediately executed. For example, a fetched instruction that includes an operand whose value is based on a previously fetched instruction cannot be executed until the previously fetched instruction has completed.

To keep track of which instructions can be executed, a processor circuit may employ one or more reservation stations. Such reservation stations can be coupled to corresponding execution units, and store fetched instructions. Reservation stations can also store state information about the instructions waiting to be executed.

As computer systems have become more complex and higher performing, the need for a reservation station to store more instructions increases. Merely adding storage to a reservation station can, however, create problems.

As more entries are added to a reservation station, the overall area of the reservation station increases. Such an increase in size of a reservation station can impact the overall design of a processor circuit by increasing the size of the processor circuit and, therefore, the cost to manufacture the processor circuit. Additionally, increasing the size can reduce the performance and increase the power consumption of the reservation station due to additional parasitic circuit elements and additional capacitive load within the reservation station.

As described above, various types of instructions may be stored in a reservation station. Such instructions can include store instructions which allow a computer system to transfer the contents of a register to a designated location in memory. Store instructions include two operands, one specifying a register containing the data to be stored, and the other specifying the location in memory where the data is to be stored. In some cases, an address of the location in memory is known in advance of the data to be stored being ready for storage. When this occurs, the store operation cannot be completed until the data is ready. In some cases, a store operation can become delinquent when the data to be stored is unavailable for use after a particular time period has elapsed since the address location in memory is available.

The embodiments illustrated in the drawings and described below provide techniques for increasing the effective size of a reservation station. By employing a secondary storage circuit for storing delinquent store operations and/or secondary smaller entries that can be used for certain types of operations, the number of instructions that can be stored in a reservation station can be increased, while minimizing the impact to the physical area of the reservation station as well as its performance and power consumption. As used herein, a store operation is delinquent when a store address of the store operation has been available for use a threshold number of cycles without the store data of the store operation being available for use.

Primary and Secondary Storage Circuits in a Reservation Station

A block diagram of an embodiment of a reservation station is depicted in FIG. 1. As illustrated, reservation station 100 includes storage circuit 101 and control circuit 104. In various embodiments, reservation station 100 may be configured to store load/store operations prior to them being issued to an execution unit or circuit.

Storage circuit 101 includes primary storage circuit 102 that includes full entries 105A-105D, and secondary storage circuit 103 that includes store-data entries 106A-106D. Although the number of entries in primary storage circuit 102 is depicted as being the same as the number of entries in secondary storage circuit 103, in other embodiments, the number of entries in primary storage circuit 102 can be greater than the number of entries in secondary storage circuit 103. It is noted that, although only four entries are depicted in each of primary storage circuit 102 and secondary storage circuit 103, in other embodiments, primary storage circuit 102 and secondary storage circuit 103 may include any suitable number of entries. For example, in some embodiments, primary storage circuit 102 may include 60 entries, and secondary storage circuit 103 may include 12 entries.

In various embodiments, full entries 105A-105D and store-data entries 106A-106D may be implemented using any suitable number of flip-flop circuits, latch circuits, or any other suitable circuit configured to store one or more bits of information. In some embodiments, a number of flip-flop or latch circuits included in a given entry of store-data entries 106A-106D is less than a number of flip-flop or latch circuits included in a given entry of full entries 105A-105D.

In various embodiments, any of store-data entries 106A-106D may be configured to store a subset of information included in any of full entries 105A-105D. For example, in some embodiments, any of full entries 105A-105D may be configured to store both store addresses and store data for a store operation, while store-data entries 106A-106D may be configured to track only a single source. Moreover, store data sources stored in store-data entries 106A-106D do not use the store addresses as the data is read from register files, resulting in store-data entries 106A-106D being, in some embodiments, five times more area efficient than full entries 105A-105D in primary storage circuit 102. It is noted that store-data entries 106A-106D may be considered a type of partial entry as they store less information than full entries 105A-105D, but are, in various embodiments, distinct in content and function from the partial entries described below in regard to FIGS. 8 and 9.

Control circuit 104 is configured to transfer store 107 from a particular one of full entries 105A-105D to a particular one of store-data entries 106A-106D in response to a determination that a store address associated with store 107 has been available for use for a threshold number of cycles without store data associated with store 107 being available for use. It is noted, that the threshold number of cycles may be programmable and may be different in different embodiments. In various embodiments, to transfer store 107 to the particular one of store-data entries 106A-106D, control circuit 104 may be further configured to transfer only a portion of the store operation, e.g., a single source associated with the store data, to the particular one of store-data entries

106A-106D. By transferring the left over store-data piece of the store operation, an entry in primary storage circuit 102 can be made available for a new load/store operation. In various embodiments, to transfer store 107, control circuit 104 may be configured to activate one or more of control signals 109.

In some embodiments, control circuit 104 will check credit pool 110 for available credits. In various embodiments, credit pool 110 will include a number of credits corresponding to available entries in store-data entries 106A-106D. As a store is transferred into secondary storage circuit 103, a credit is removed from credit pool 110, and when a store is issued from secondary storage circuit 103, a credit is added to credit pool 110. It is noted that this is one type of credit-based management system that can be employed. In other embodiments, other credit-based management systems are possible and contemplated.

Control circuit 104 may be further configured to receiver power information 108. In various embodiments, power information 108 may be sent to control circuit 104 from a power management unit ("PMU"), a power-management integrated circuit ("PMIC"), or any other suitable power management circuit. In some embodiments, power information 108 may include information indicative of whether or not a power consumption of at least part of a computer system, in which reservation station 100 is included, is exceeding a threshold value. Control circuit 104 may be configured to halt transfers of store operations from primary storage circuit 102 to secondary storage circuit 103 in response to a determination that the power consumption is greater than the threshold value.

In some embodiments, to transfer store 107, control circuit 104 may be further configured to compare a number of free entries in primary storage circuit 102 to watermark 111. In response to a determination that the number of free entries in primary storage circuit 102 is less than watermark 111, control circuit 104 may proceed with the transfer of store 107. For example, if the number of free entries in primary storage circuit 102 is less than 10, control circuit 104 can allow transfers from primary storage circuit 102 to secondary storage circuit 103. In cases where the number of free entries in primary storage circuit 102 is greater than watermark 111, control circuit 104 may be configured to halt transfers from primary storage circuit 102 to secondary storage circuit 103. In some embodiments, the value of watermark 111 may be programmable based on system load, power consumption, or any other suitable metric.

To transfer store 107, control circuit 104 may, in some embodiments, be further configured to wait until kill window 112 expires after the store address associated with store 107 issues. If the store data associated with store 107 becomes ready during kill window 112, control circuit 104 will not transfer store 107 to secondary storage circuit 103, but leave it stored in primary storage circuit 102 to be picked for issuing. In some embodiments, the duration of kill window 112 may be programmable based on system load, power consumption, or any other suitable metric.

In cases where store 107 is a store pair operation, i.e., a store operation that stores the contents of two registers to memory, control circuit 104 is configured to transfer the two stores included in the store pair to separate entries in secondary storage circuit 103. In various embodiments, the entries for the store pair are managed independently in secondary storage circuit 103. It is noted that when store 107 is a store pair operation, control circuit 104 is configured to determine if two credits are available in credit pool 110 in order to transfer the store pair operation. When two credits are not available, the store pair operation is not transferred. In various embodiments, control circuit 104 is configured to transfer the two stores in the store pair in back-to-back cycles.

Figure 2:
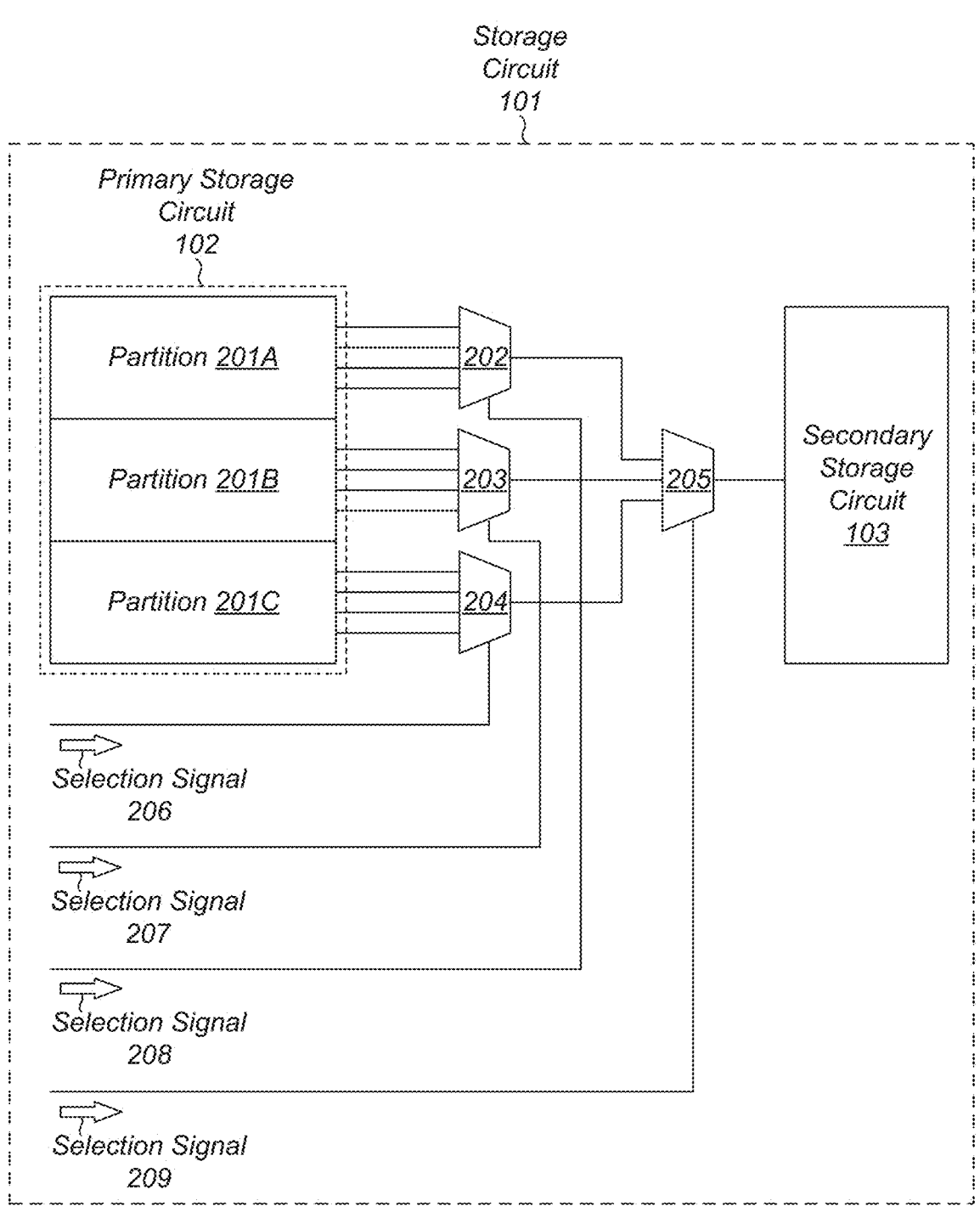
FIG. 2 is a block diagram depicting an embodiment of a storage circuit for a reservation station.

Different techniques can be employed to select which delinquent store is transferred from primary storage circuit 102 to secondary storage circuit 103. An example of one such technique is illustrated in FIG. 2, which depicts a block diagram of an embodiment of storage circuit 101. As illustrated, storage circuit 101 includes primary storage circuit 102, secondary storage circuit 103, and multiplex circuits 202-205.

Primary storage circuit 102 includes partitions 201A-201C. In various embodiments, different subsets of full entries 105A-105D are assigned to corresponding ones of partitions 201A-201C. In some embodiments, different ones of partitions 201A-201C may be operated independently. In some cases, different ones of partitions 201A-201C may be placed in a low-power or sleep mode while the remaining ones of partitions 201A-201C may remain active. Although only three partitions are depicted, in other embodiments, any suitable number of partitions may be employed.

Multiplex circuit 202 is configured to select different ones of entries included partition 201A based on selection signal 208, and send the selected entry to multiplex circuit 205. In a similar fashion, multiplex circuits 203 and 204 select different entries from partitions 201B and 201C, respectively, based on selection signals 207 and 206. In various embodiments, control circuit 104 is configured to generate selection signals 206-208 to select the oldest delinquent entries in partitions 201A-201C. Although selection signals 206-208 are depicted as single wires, in various embodiments, selection signals 206-208 may include any suitable number of wires to allow multiplex circuits 202-204 to select any entry in their respective partitions.

It is noted that multiplex circuits 202-204 can be coupled to only portions of full entries 105A-105D since store address information does not need to be transferred to secondary storage circuit 103. In various embodiments, multiplex circuits 202-205 may be implemented using any suitable combination of logic gates, metal-oxide semiconductor field-effect transistors ("MOSFETs"), or any other suitable devices.

The outputs of multiplex circuits 202-204 are coupled to inputs of multiplex circuit 205. The output of multiplex circuit 205 is coupled to secondary storage circuit 103. In various embodiments, multiplex circuit 205 is configured to select one of the outputs of multiplex circuits 202-204 based on selection signal 209. Control circuit 104 may, in various embodiments, generate selection signal 209 according to a selection algorithm. For example, in some embodiments, control circuit 104 may generate selection signal 209 such that the outputs of multiplex circuits 202-204 are selected in a round-robin fashion. Although selection signal 209 is depicted as a single wire, in various embodiments, selection signal 209 may include any suitable number of wires to allow multiplex circuit 205 to select from the outputs of multiplex circuits 202-204 coupled to the partitions in primary storage circuit 102.

Secondary storage circuit 103 is configured to receive the output of multiplex circuit 205, and store the output in a given one of store-data entries 106A-106D based on control signals 109. In various embodiments, control circuit 104 may generate control signals 109 based on credit pool 110.

In various embodiments, the number of multiplex circuits is based on a number of partitions included in primary storage circuit 102. Although two levels of multiplexing is depicted in the embodiment of FIG. 2, in other embodiments, any suitable number of levels of multiplexing may be employed.

Figure 3:
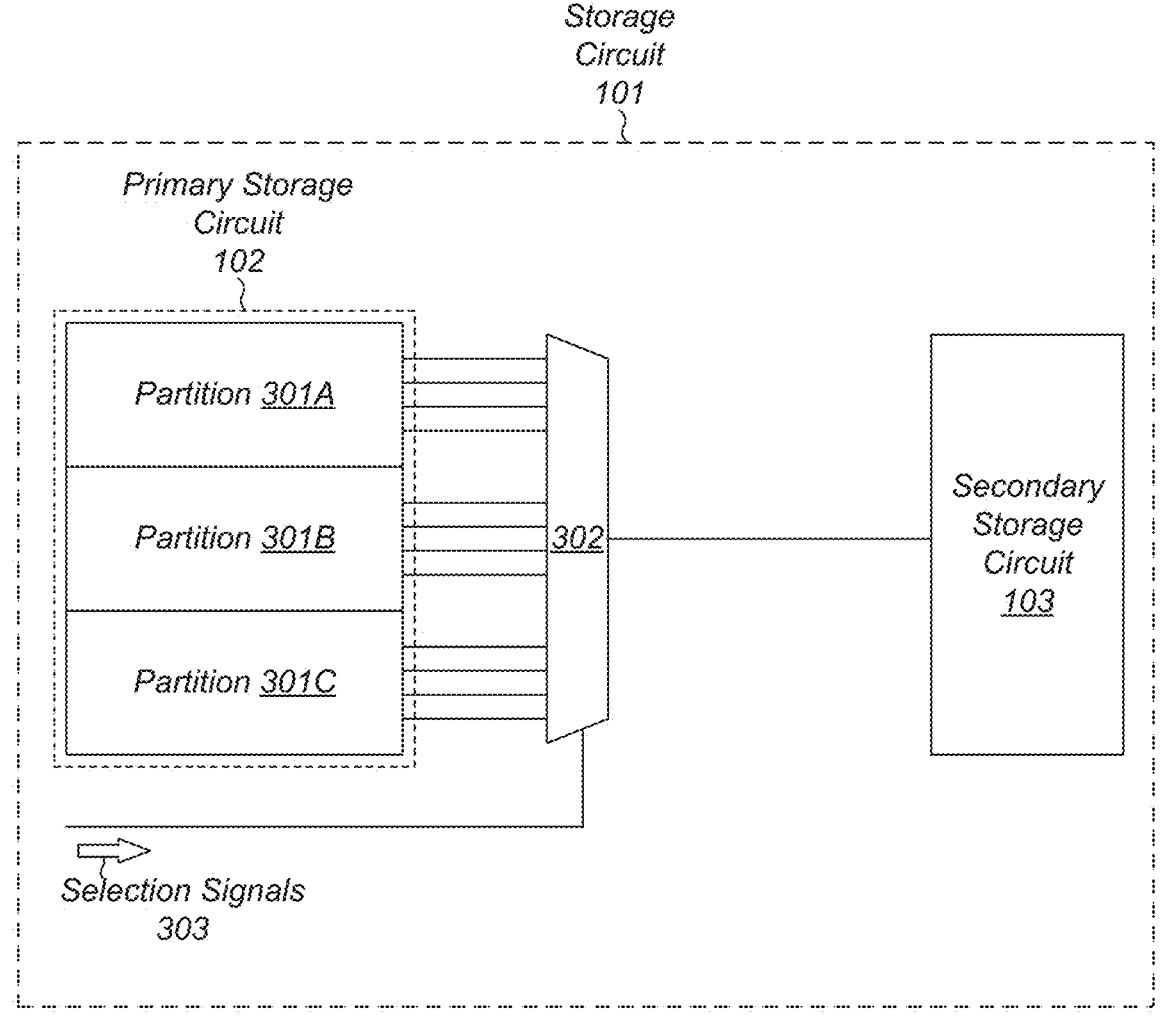
FIG. 3 is a block diagram depicting a different embodiment of a storage circuit for a reservation station.

Turning to FIG. 3, a block diagram of a different embodiment of storage circuit 101 that uses a different selection technique for transferring delinquent store operations is depicted. As illustrated, storage circuit 101 includes primary storage circuit 102, secondary storage circuit 103, and multiplex circuit 302.

Primary storage circuit 102 includes partitions 301A-301C. In various embodiments, different subsets of full entries 105A-105D are assigned to corresponding ones of partitions 301A-301C. In some embodiments, different ones of partitions 301A-301C may be operated independently. In some cases, different ones of partitions 301A-301C may be placed in a low-power or sleep mode while the remaining ones of partitions 301A-301C may remain active. Although only three partitions are depicted, in other embodiments, any suitable number of partitions may be employed.

Multiplex circuit 302 is configured to select one entry from across partitions 301A-301C based on selection signals 303. In various embodiments, control circuit 104 is configured to generate selection signals 303 to select the oldest delinquent entries across partitions 301A-301C. Although selection signals 303 is depicted as a single wire, in various embodiments, selection signals 303 may include any suitable number of wires to allow multiplex circuit 302 to select any entry across partitions 301A-301C. In various embodiments, multiplex circuit 302 may be implemented using any suitable combination of logic gates, metal-oxide semiconductor field-effect transistors ("MOSFETs"), or any other suitable devices.

Secondary storage circuit 103 is configured to receive the output of multiplex circuit 302 and store the output in a given one of store-data entries 106A-106D based on control signals 109. In various embodiments, control circuit 104 may generate control signals 109 based on credit pool 110.

Figure 4:
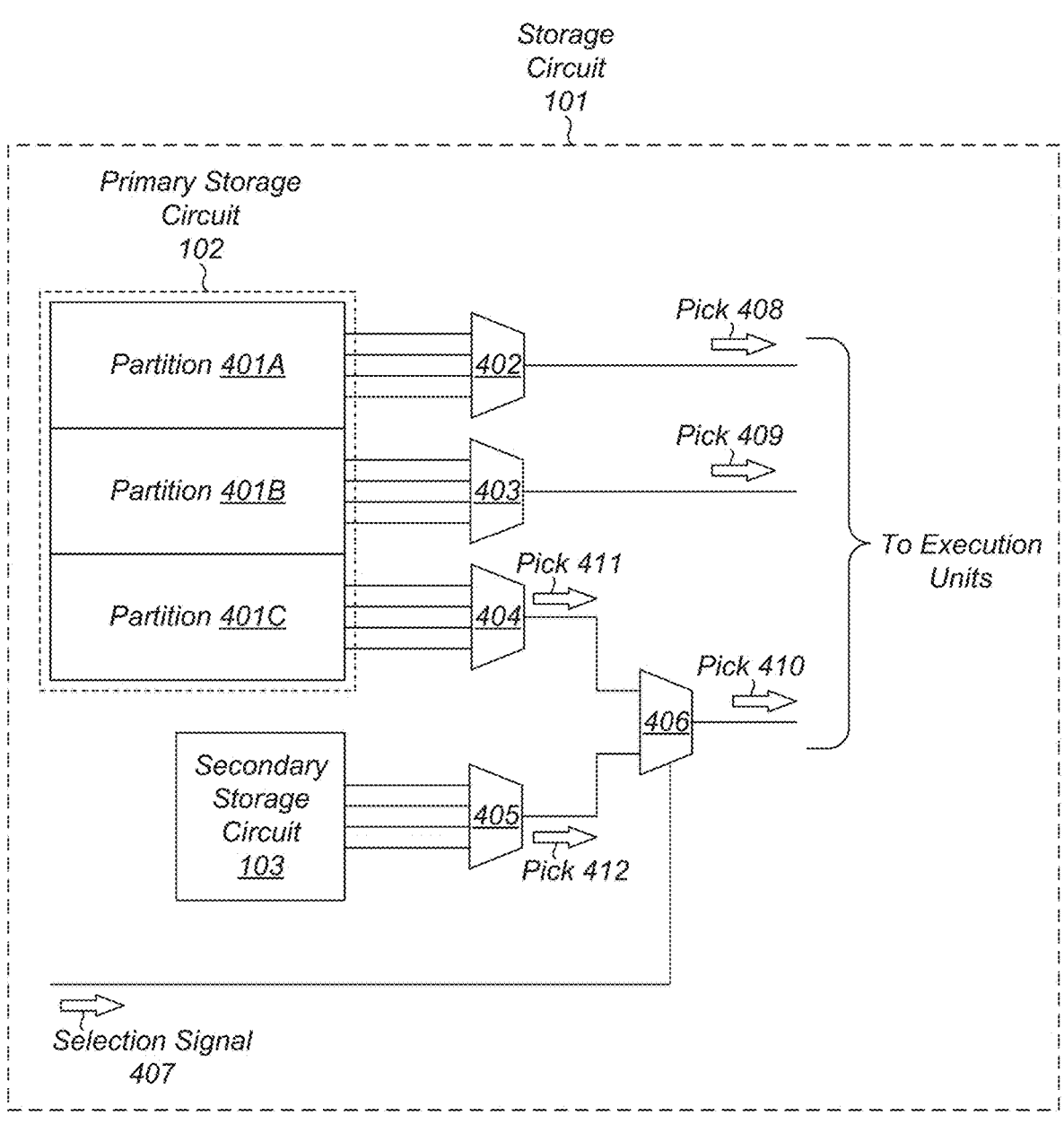
FIG. 4 is a block diagram depicting an embodiment of a storage circuit and issue selection circuits for a reservation station.

As the load/store operations stored in reservation station 100 become ready, the operations are issued to one or more execution units or circuits. Different techniques may be employed to select which of the ready store operations are issued. One such technique is depicted in the embodiment of FIG. 4. As illustrated, storage circuit 101 includes primary storage circuit 102, secondary storage circuit 103, and multiplex circuits 402-406.

Primary storage circuit 102 includes partitions 401A-401C. In various embodiments, different subsets of full entries 105A-105D are assigned to corresponding ones of partitions 401A-401C. In some embodiments, different ones of partitions 401A-401C may be operated independently. In some cases, different ones of partitions 401A-401C may be placed in a low-power or sleep mode while the remaining ones of partitions 401A-401C may remain active. Although only three partitions are depicted, in other embodiments, any suitable number of partitions may be employed.

Multiplex circuit 402 is configured to select different ones of entries included in partition 401A to generate pick 408, while multiplex circuit 403 is configured to select different ones of entries included in 401B to generate pick 409. Multiplex circuit 404 is configured to select different ones of entries included in partition 401C to generate pick 411. In a similar fashion, multiplex circuit 405 is configured to select different ones of entries included in secondary storage circuit 103 to generate pick 412. Multiplex circuit 406 is configured to select one of pick 411 and pick 412 to generate pick 410. It is noted that the selection signals for multiplex circuits 402-405 have been omitted for clarity.

In various embodiments, control circuit 104 is configured to operate multiplex circuits 402-405 such that, for a given cycle, pick 408 corresponds to the oldest ready load/store operation in partition 401A, pick 409 corresponds to the oldest ready load/store operation in partition 401B, pick 411 corresponds to the oldest ready load/store operation in partition 401C, and pick 412 corresponds to the oldest ready store-data operation in secondary storage circuit 103. Control circuit 104 may be further configured to operate, via selection signal 407, multiplex circuit 406 such that pick 412 is given priority over pick 411 in a given cycle since it is likely that any transferred store-data operations that have been transferred to secondary storage circuit 103 are older than load/store operations stored in primary storage circuit 102. In some embodiments, there is one pick per cycle.

In various embodiments, multiplex circuits 402-406 may be implemented using any suitable combination of logic gates, MOSFETs, or any other suitable devices. It is noted that the issue technique depicted in FIG. 4 may be used in conjunction with any of the previously described transfer techniques.

Figure 5:
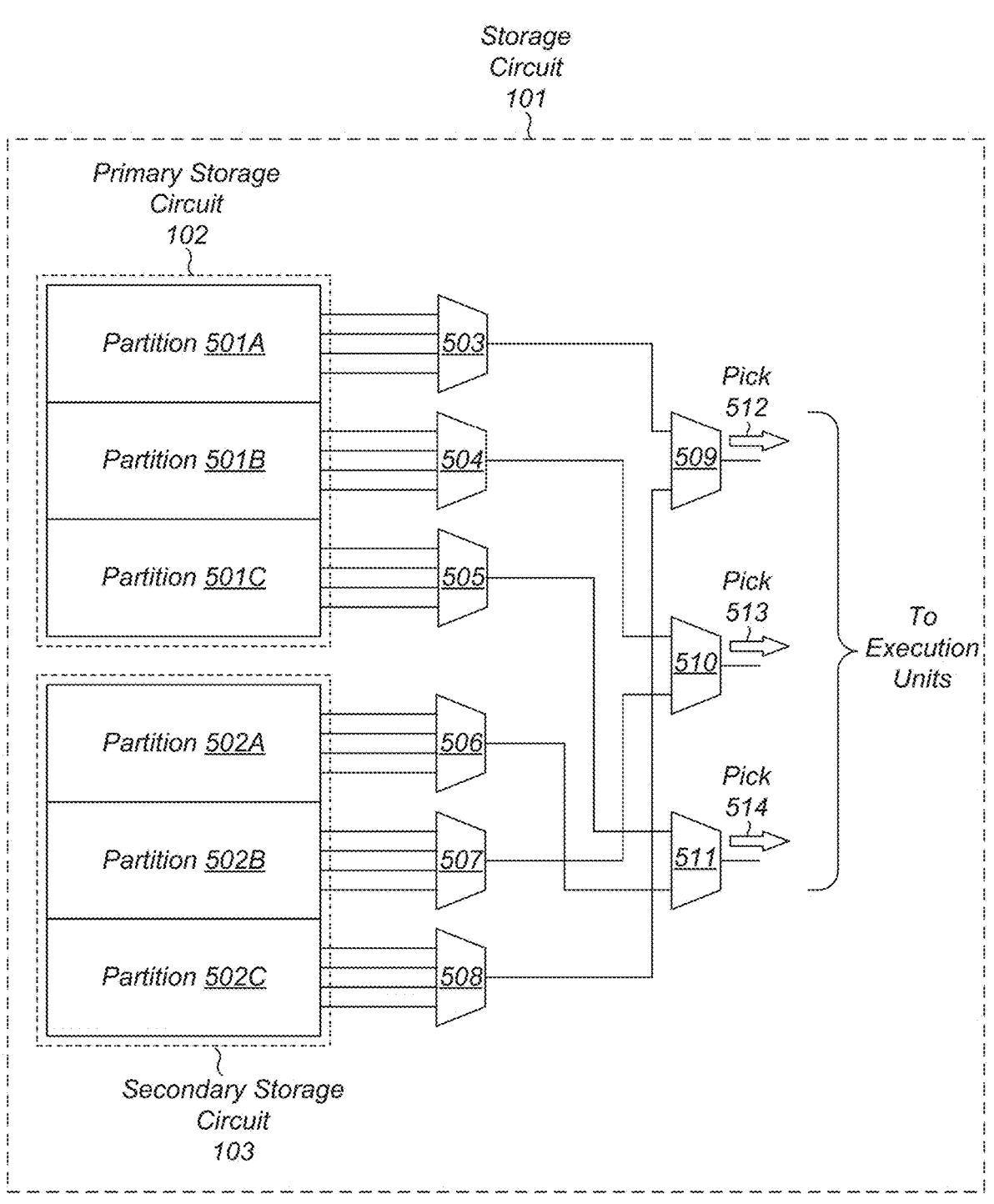
FIG. 5 is a block diagram depicting a different embodiment of a storage circuit and issue selection circuits for a reservation station.

A different technique for issuing load/store operations is depicted in FIG. 5. As illustrated, storage circuit 101 includes primary storage circuit 102, secondary storage circuit 103, and multiplex circuits 503-511.

Primary storage circuit 102 includes partitions 501A-501C. In various embodiments, different subsets of full entries 105A-105D are assigned to corresponding ones of partitions 501A-501C. In some embodiments, different ones of partitions 501A-501C may be operated independently. In some cases, different ones of partitions 501A-501C may be placed in a low-power or sleep mode while the remaining ones of partitions 501A-501C may remain active. Although only three partitions are depicted, in other embodiments, any suitable number of partitions may be employed.

Secondary storage circuit 103 includes partitions 502A-502C. In various embodiments, different subsets of store-data entries 106A-106D are assigned to corresponding ones of partitions 502A-502C. As with primary storage circuit 102, different ones of partitions 502A-502C may be operated independently.

Multiplex circuit 503 is configured to select one entry from partition 501A. In a similar fashion, multiplex circuits 504 and 505 are configured to select one entry from each of partitions 501B and 501C, respectively. Multiplex circuit 506 is configured to select one entry from partition 502A. In a similar fashion, multiplex circuits 507 and 508 are configured to select one entry from each of partitions 502B and 502C, respectively. Multiplex circuit 509 is configured to select between the outputs of multiplex circuits 503 and 508 to generate pick 512. Multiplex circuit 510 is configured to select between the outputs of multiplex circuits 504 and 507 to generate pick 513. Multiplex circuit 511 is configured to select between the outputs of multiplex circuits 505 and 506 to generate pick 514.

In various embodiments, control circuit 104 is configured to operate multiplex circuits 503-511 such that one pick is made per partition per cycle. Control circuit 104 may be further configured to operate multiplex circuits 509-511 such that ready store-data operations in partitions 502A-502C are given preference over ready load/store operations stored in partitions 501A-501C.

In various embodiments, multiplex circuits 503-511 may be implemented using any suitable combination of logic gates, MOSFETs, or any other suitable devices. It is noted that the issue technique depicted in FIG. 5 may be used in conjunction with any of the previously described transfer techniques.

To summarize, a reservation station that includes a primary storage circuit and a secondary storage circuit is disclosed. Broadly speaking, the primary storage circuit may include a plurality of full entries configured to store data indicative of corresponding load/store operations of a plurality of load/store operations. The secondary storage circuit may include a plurality of store-data entries. A given store-data entry of the plurality of store-data entries may be configured to store a subset of information stored in a given full entry of the plurality of full entries. A control circuit may be configured to transfer a particular store operation from a particular full entry of the plurality of full entries to a particular store-data entry of the plurality of store-data entries in response to a determination that a store address corresponding to the particular store operation has been available for use for a threshold number of cycles without store data corresponding to the particular store operation being available for use.

Turning to FIG. 6, a flow diagram depicting an embodiment of a method for operating a reservation station is illustrated. The method, which may be applied to various reservation stations, e.g., reservation station 100 as depicted in FIG. 1, begins in block 601.

The method includes storing a plurality of load/store operations in corresponding full entries of a plurality of full entries included in a primary storage circuit included in a reservation station (block 602). In various embodiments, the reservation station may be coupled to at least one execution unit.

The method further includes transferring, by the reservation station, a particular store operation from a particular full entry of the plurality of full entries to a particular store-data entry of a plurality of store-data entries included in a secondary storage circuit included in the reservation station (block 603). In various embodiments, a given store-data entry of the plurality of store-data entries is configured to store a subset of information included in a given full entry of the plurality of full entries.

In some embodiments, transferring the particular store operation includes selecting, by the reservation station during a first cycle and according to a selection algorithm, the particular store operation from a plurality of store operations that are delinquent. In other embodiments, the method may further include selecting, by the reservation station during a second cycle subsequent to the first cycle, a different store operation from the plurality of store operations that are delinquent, and transferring, by the reservation station during the second clock cycle, the different store operation from its corresponding full entry of the plurality of full entries to a store-data entry of the plurality of store-data entries.

In some embodiments, the primary storage circuit includes a plurality of partitions. In such cases, subsets of the plurality of full entries are assigned to corresponding partitions of the plurality of partitions. In various embodiments, the method may further include selecting, by the reservation station, across the plurality of partitions, an oldest delinquent store operation, and transferring, by the reservation station, the oldest delinquent store operation to a different store-data entry of the plurality of store-data entries.

In other embodiments, the method may further include selecting, by the reservation station from the plurality of partitions, corresponding oldest delinquent store operations of a plurality of oldest delinquent store operations, and selecting, by the reservation station according to a round-robin selection algorithm, a particular oldest delinquent store operation from the plurality of oldest delinquent store operations. The method may additionally include transferring, by the reservation station, the particular oldest delinquent store operation to a different store-data entry of the plurality of store-data entries.

In some embodiments, the method may further include receiving, by the reservation station, power information, and halting, by the reservation station, the transfer of store operations from the primary storage circuit to the secondary storage circuit in response to determining that the power information indicates a power consumption of at least part of a computer system that includes the reservation station is greater than a threshold value.

In various embodiments, transferring the particular store operation may include checking a number of free entries in the primary storage circuit. In response to determining that the number of free entries is below a watermark value, the particular store operation may be transferred to the secondary storage circuit. In other embodiments, transferring the particular store operation may include, in response to determining that a store address associated with the particular store operation has issued, waiting until a kill window has expired before transferring the particular store operation. The method concludes in block 604.

Figure 7:
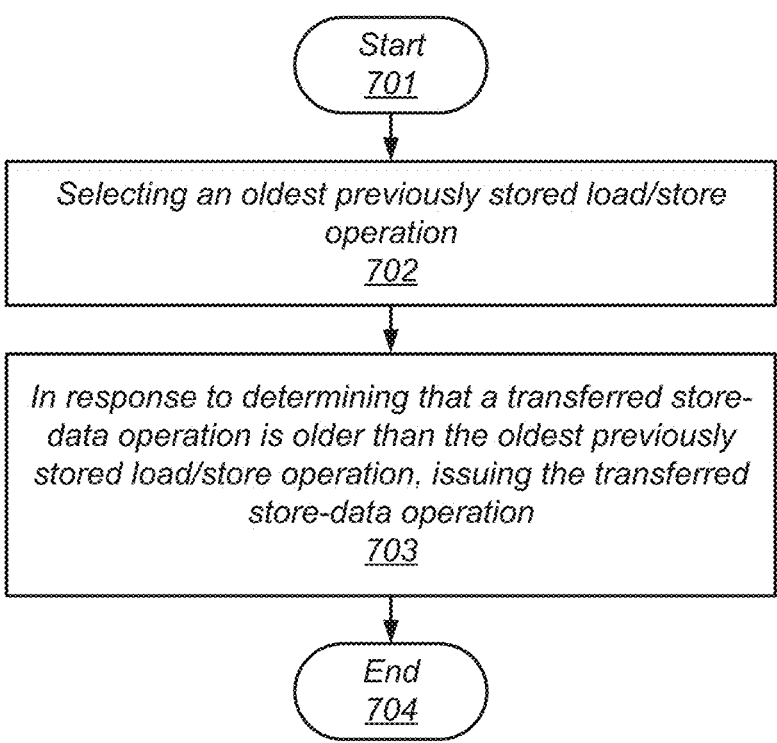
FIG. 7 is a flow diagram depicting an embodiment of a method for issuing store operations from a reservation station that includes primary and secondary storage circuits.

Turning to FIG. 7, a flow diagram depicting an embodiment of a method for issuing store operations from a reservation station that includes primary and secondary storage circuits is depicted. The method, which may be applied to various reservation stations, e.g., reservation station 100, begins in block 701.

The method includes selecting an oldest previously stored load/store operation (block 702). As described above, load/store operations are initially stored in a primary storage circuit of a reservation station. In some embodiments, the primary storage circuit may be divided into partitions. In some cases, selecting the oldest previously stored load/store operation may include selecting an oldest load/store operation from each partition. In various embodiments, one or more of the selected load/store operations may be issued after selection.

The method also includes, in response to determining that a transferred store-data operation is older than the oldest previously stored load/store operation, issuing the transferred store-data operation (block 703). As described above, some store-data operations are transferred to a secondary storage circuit if they become delinquent. In some embodiments where the primary storage circuit is divided into partitions, the method may include performing a comparison of an age of an oldest store-data operation stored in the secondary storage circuit to an age of an oldest load/store operation from a particular partition of the partitions of the primary storage circuit. The method may also include issuing, based on a result of the comparison, one of the oldest store-data operations and the oldest load/store operation from the particular partition.

In other embodiments, the secondary storage circuit may also be divided into partitions. In such cases, the method may include selecting respective oldest load/store operations from the partitions of the primary storage circuit, and selecting respective oldest store-data operations from the partitions of the secondary storage circuit. The method may also include performing, on a per-cycle basis, a comparison of an age of an oldest load/store operation from a given partition of the primary storage circuit to an age of an oldest store-data operation in a corresponding partition of the secondary storage circuit. The method may further include issuing one of the oldest load/store operation from the given partition of the primary storage circuit or the oldest store-data operation in the corresponding partition of the secondary storage circuit based on a result of the comparison. The method concludes in block 704.

Reservation Station with Multiple Entry Types

As described above, the size of a reservation station can be increased, while minimizing the impact on performance, power, and area, through the use of a secondary storage circuit used to store delinquent stores. Other approaches for increasing the size of a reservation station are also possible.

In some computer systems, some types of load/store operations occur with greater frequency than other types of load/store operations. In some cases, the load/store operations that occur with greater frequency do not need to store as much information in the reservation station. For example, a single source load or store operation requires less storage in a reservation station that a multi-source load or store operation. As described below, employing a number of bespoke entries for different types of load/store operations that require less storage can allow a reservation station to handle larger number of operations without incurring the same performance, power, and area impact that merely increasing the number of full entries would entail.

Figure 8:
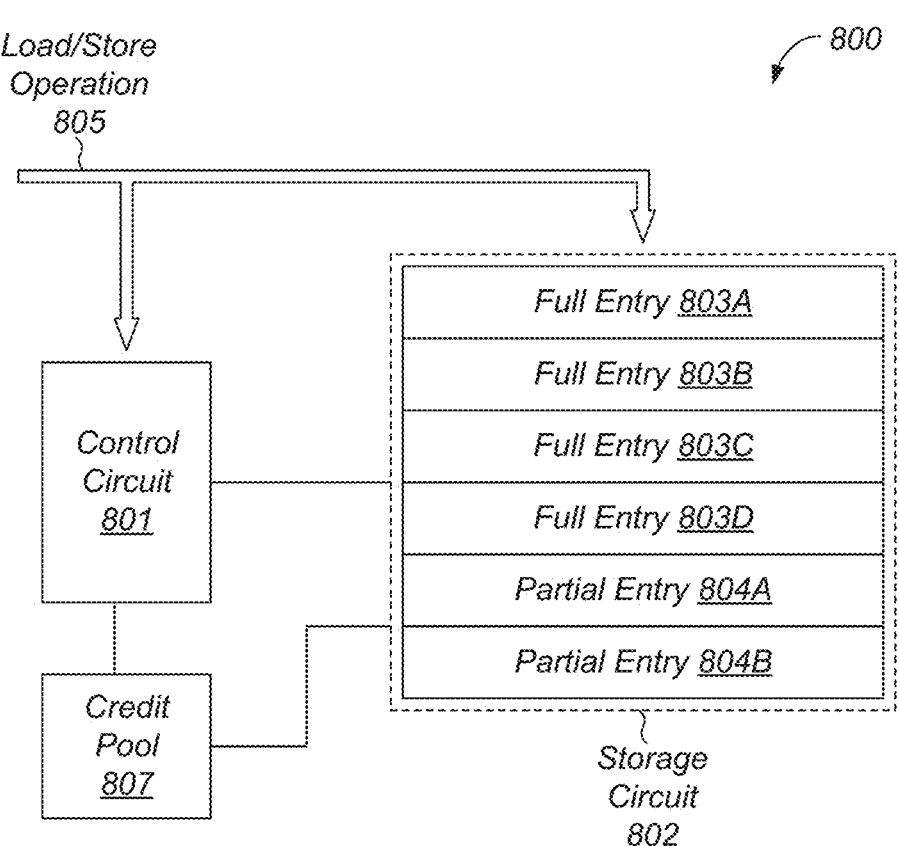
FIG. 8 is a block diagram of an embodiment of a reservation station that includes primary and secondary entries.

A block diagram of an embodiment of a reservation station with multiple entry types is depicted in FIG. 8. As illustrated, reservation station 800 includes control circuit 801 and storage circuit 802.

Storage circuit 802 includes multiple primary entries (denoted as "full entries 803A-803D") and multiple secondary entries (denoted as "partial entries 804A-804B"). Full entries 803A-803D are configured to store a first amount of data corresponding to a multi-source load/store operation. In contrast, partial entries 804A-804B are configured to store a second amount of data corresponding to a single-source load/store operation. Since partial entries 804A-804B only need to store the information associated with a single source, the second amount of data is less than the first amount of data. Accordingly, flip-flop or other storage circuits that would be used to store data associated with other sources can be omitted from partial entries 804A-804B, resulting in partial entries 804A-804B being physically smaller than full entries 803A-804D.

In various embodiments, full entries 803A-803D and partial entries 804A-804B may be implemented using any suitable number of combinatorial logic gates as well as flip-flop circuits, latch circuits, or any other suitable circuit configured to store one or more data bits.

Although storage circuit 802 is depicted as including 6 total entries, in other embodiments, storage circuit 802 may include any suitable number of entries. In some embodiments, the number of full entries versus the number of partial entries may be based on an expected number of single-source load/store operations relative to an expected number of multi-source load/store operations to be processed by a computer system during operation. For example, in some embodiments, storage circuit 802 may include 60 entries with 50 entries dedicated to multi-source load/store operations and 10 entries dedicated to single-source load/store operations.

It is noted that storage circuit 802 may, in some embodiments, correspond to primary storage circuit 102 as depicted in FIG. 1. In such cases, a reservation station may take full advantage of the secondary storage for delinquent store operations in addition to some entries in the primary storage circuit being physically smaller as they are dedicated to frequently used load/store operations that require less storage.

Control circuit 801 is configured to receive load/store operation 805. In various embodiments, control circuit 801 is further configured to store load/store operation in a particular one of partial entries 804A-804B in response to a determination that load/store operation 805 includes only a single source. In the case wherein load/store operation 805 is a multi-source load/store operation, control circuit 801 can be configured to store load/store operation 805 in a particular one of full entries 803A-803D.

In cases when load/store operation 805 is a single-source load/store operation, control circuit 801 may be further configured to check credit pool 807 to determine if there is a free credit associated with partial entries 804A-804B. In response to a determination that a credit is available in credit pool 807, control circuit 801 can be configured to store load/store operation 805 in a particular one of partial entries 804A-804B. If, however, a credit is not available, control circuit 801 can be configured to store load/store operation 805 in one of full entries 803A-803D. It is noted that when load/store operation 805 is issued, its associated credit is returned to credit pool 807.

Although the embodiment of FIG. 8 is described as being used with load/store operations, in other embodiments, the use of primary and secondary entries with other types of operations is possible and contemplated.

Figure 9:
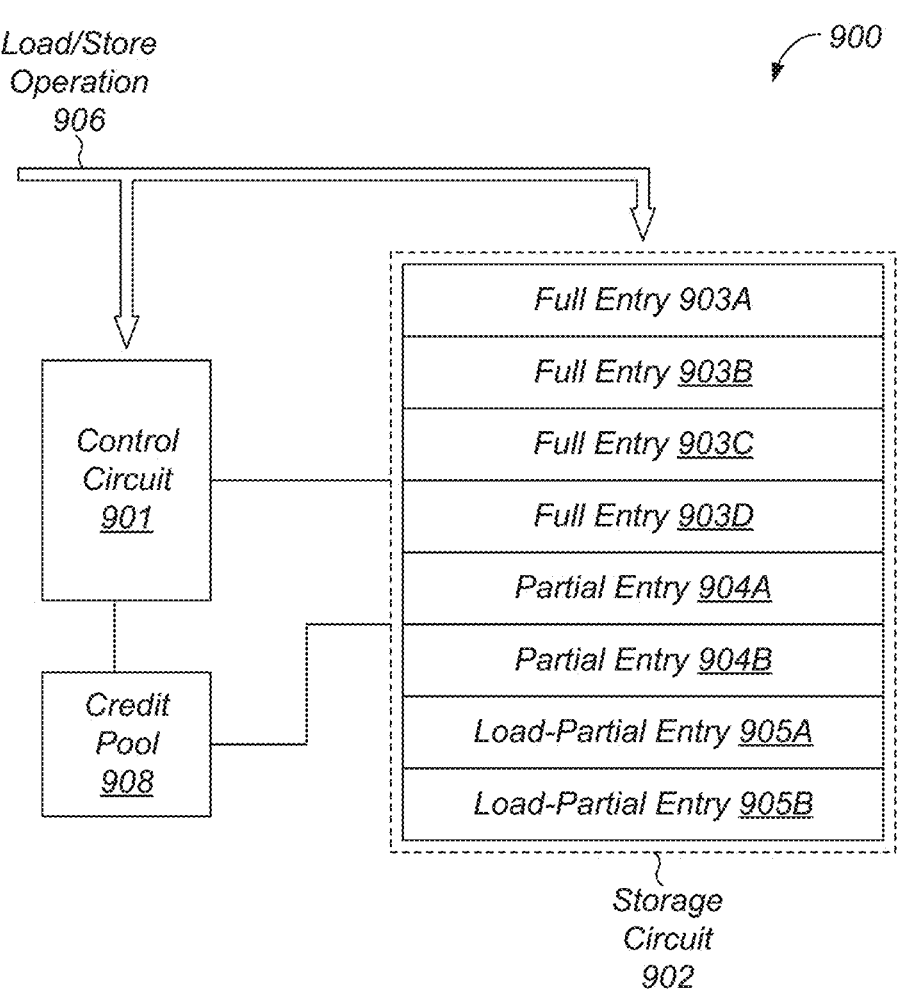
FIG. 9 is a block diagram of a different embodiment of a reservation station that includes primary and store-data entries.

In some cases, additional types of entries dedicated to other types of operations can be included in the storage circuit of a reservation station. A block diagram of a reservation station that includes two types of dedicated entries is depicted in FIG. 9. As illustrated, reservation station 900 includes control circuit 901 and storage circuit 902.

Storage circuit 902 includes multiple primary entries (denoted as "full entries 903A-903D"), multiple secondary entries (denoted as "partial entries 904A-904B"), and multiple tertiary entries (denoted as "load-partial entries 905A-905B). Full entries 903A-903D are configured to store a first amount of data corresponding to a multi-source load/store operation, partial entries 904A-904B are configured to store a second amount of data corresponding to a single-source load/store operation, while load-partial entries 905A-905B are configured to store a third amount of data correspond to a single-source load operation that does not use information from a load-store predictor (referred to as a "slim load operation").

Since partial entries 904A-904B only need to store information associated with a single source, the second amount of data is less than the first amount of data. In a similar fashion, the third amount of storage is less than the second amount of storage since load-partial entries 905A-905B only need to store information for single-source load operations. Accordingly, the number of flip-flop or latch circuits needed in load-partial entries 905A-905B is less than those employed in partial entries 904A-904B.

Although storage circuit 902 is depicted as including full entries, partial entries, and load-partial entries, in other embodiments, storage circuit 902 may include full entries and load-partial entries without including partial entries. The number of load-partial entries, as well as whether or not partial entries are included, may be based on expected numbers of load/store operations, single-source operations, and slim loads that will occur in a computer system during operation.

It is noted that storage circuit 902 may, in some embodiments, correspond to primary storage circuit 102 as depicted in FIG. 1. In such cases, a reservation station may take full advantage of the secondary storage for delinquent store operations in addition to some entries in the primary storage circuit being physically smaller as they are dedicated to frequently used load/store operations that require less storage.

Control circuit 901 is configured to receive load/store operation 906. In various embodiments, control circuit 901 is further configured to store load/store operation 906 in a particular one of load-partial entries 905A-905B in response to a determination that load/store operation 906 is a slim load operation. Additionally, control circuit 901 is further configured to store load/store operation 906 in a particular one of partial entries 904A-904B in response to a determination that load/store operation 906 includes only a single source. In the case wherein load/store operation 906 is a multi-source load/store operation, control circuit 901 can be configured to store load/store operation 906 in a particular one of full entries 903A-903D.

In cases when load/store operation 906 is a single-source load/store operation, control circuit 901 may be further configured to check credit pool 908 to determine if there is a free credit associated with load-partial entries 905A-905B. In response to a determination that a credit is available in credit pool 908, control circuit 901 can be configured to store load/store operation 906 in a particular one of load-partial entries 905A-905B.

If credits are not available for any of partial entries 904A-904B and load-partial entries 905A-905B, control circuit 901 can be configured to store load/store operation 906 in one of full entries 903A-903D. It is noted that when load/store operation 906 is issued, its associated credit is returned to credit pool 908.

Although the embodiment of FIG. 9 is described as being used with load/store operations, in other embodiments, the use of primary and secondary entries with other types of operations is possible and contemplated.

In some embodiments, control circuit 901 is configured to link one of full entries 903A-903D to one of load-partial entries 905A-905B to form two load-partial entries that include a resource that can be shared by a full entry. The two load-partial entries are referred to as "buddy entries."

Figures 10A, 10B:
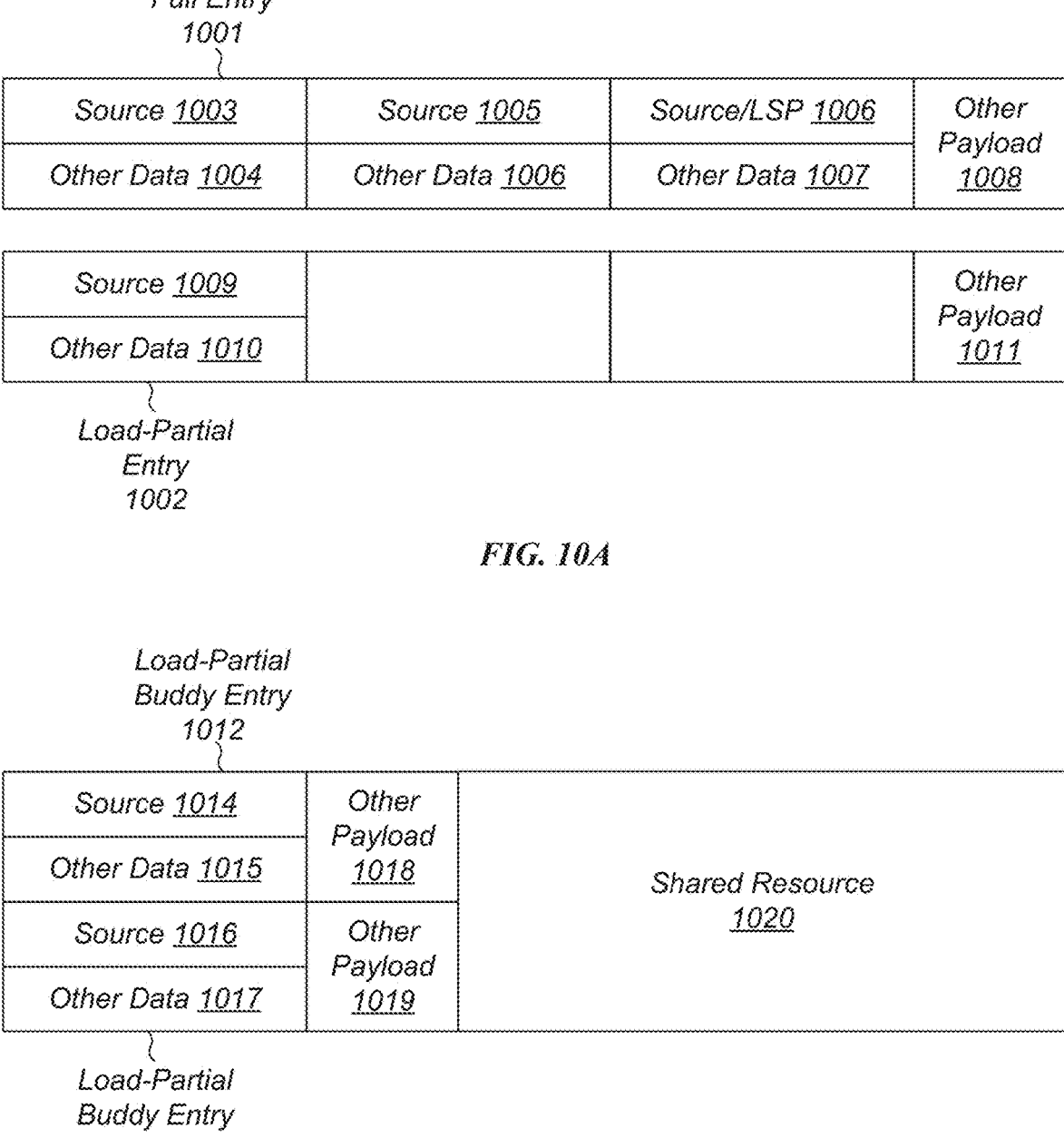
FIG. 10A is a block diagram depicting the respective contents of a full entry and a load-store entry.
FIG. 10B is a block diagram depicting the respective contents of two load-store buddy entries.

The respective contents of a full entry and a load-partial entry are depicted in FIG. 10A. As illustrated, full entry 1001 includes source 1003 with its associated other data 1004, and source 1005 with its associated other data 1006. Additionally, full entry 1001 includes source/LSP 1006 and its associate other data 1007, and other payload 1008. In various embodiments, other data 1004, 1106, and 1007 may include valid flags, CAM tags, and the like. Load-partial entry 1002 includes source 1009 and its associated other data 1010, along with other payload 1011.

Once the full entry and load-store entry are linked, the empty region in load-partial entry contents can be combined with portions of the contents of full entry 1001 to form a shared resource for a multi-source entry.

Turning to FIG. 10B, the linked full entry and load-partial entries appear as two load-partial buddy entries along with a shared resource. As illustrated, load-partial buddy entry 1012 includes source 1014 and its associated other data 1015, along with other payload 1018, while load-partial buddy entry 1013 includes source 1016 and its associated other data 1017, along with other payload 1019. The rest of the linked entries form shared resource 1020, which can be used to store a 2-source load/store operation. By linking entries in this fashion, two load-partial entries, along with a full entry can be stored in the circuits normally supporting two full entries.

To summarize, a reservation station that includes a storage circuit with a plurality of full entries and a plurality of partial entries is disclosed. Broadly speaking, a given full entry of the plurality of full entries may be configured to store a first amount of data, and a given partial entry of the plurality of partial entries may be configured to store a second amount of data less than the first amount of data. A control circuit may be configured to receive a load/store operation and, in response to a determination that the load/store operation includes only a single source, store the load/store operation in a particular partial entry of the plurality of partial entries.

Turning to FIG. 11, a flow diagram depicting an embodiment of a method for operating a reservation station that includes multiple type of entries is illustrated. The method, which may be applied to various reservation stations, e.g., reservation station 800 as depicted in FIG. 8, begins in block 1101.

The method includes receiving, by a reservation station, a first load/store operation (block 1102). In various embodiments, the reservation station includes a storage circuit including a plurality of primary entries and plurality of partial entries. In such cases, a given primary entry of the plurality of primary entries is configured to store a first amount of data, and a given secondary entry of the plurality of partial entries is configured to store a second amount of data less than the first amount of data. In some embodiments, the first amount of data and the second amount of data correspond to different portions of data included in a load/store or other operation received by the reservation station.

The method further includes checking, by the reservation station, first characteristics of the first load/store operation (block 1103). In various embodiments, checking the first characteristics includes determining a number of sources included in the first load/store operation.

The method also includes storing, by the reservation station, the first load/store operation in a particular secondary entry of the plurality of partial entries in response to determining that the first load/store operation includes only a single source (block 1104).

In various embodiments, the method may further include requesting, by the reservation station, a credit associated with the plurality of partial entries, and storing, by the reservation station in response to receiving the credit, the first load/store operation in the particular secondary entry. In such cases, the method may also include releasing, by the reservation station, the credit in response to issuing the first load/store operation.

In some embodiments, the method may include receiving, by the reservation station, a second load/store operation, and checking, by the reservation station, second characteristics of the second load/store operation. The method may additionally include storing the second load/store operation in a particular primary entry of the plurality of primary entries in response to determining that the second load/store operation includes more than one source.

In some embodiments, the method may additionally include receiving a different load/store operation that includes a single source, and checking, by the reservation station, for an available credit associated with the plurality of partial entries. In such cases, the method may further include storing, by the reservation station in response to determining that no credits associated with the plurality of partial entries are available, the different load/store operation in a particular primary entry of the plurality of primary entries.

In other embodiments, the reservation station may include a secondary storage circuit. In such cases, the method may further include transferring, by the reservation station, a particular store operation from the primary storage circuit to the secondary storage circuit in response to determining that the particular store operation is delinquent.

The method concludes in block 1105. It is noted that the embodiment of the method depicted in FIG. 11 may be used in conjunction with either of the methods described in FIGS. 6 and 7.

Turning to FIG. 12, a flow diagram depicting a different embodiment of a method for operating a reservation station that includes multiple type of entries is illustrated. The method, which may be applied to various reservation stations, e.g., reservation station 900 as depicted in FIG. 9, begins in block 1201.

The method includes receiving, by a reservation station, a first load/store operation (block 1202). In various embodiments, the reservation station includes a storage circuit including a plurality of primary entries and a plurality of partial entries. It is noted that, in some embodiments, other sets of entries for different types of operations may be included in the storage circuit as well. In various embodiments, a given primary entry of the plurality of primary entries is configured to store a first amount of data, and a given secondary entry of the plurality of partial entries is configured to store a second amount of data less than the first amount of data. In some embodiments, the first amount of data and the second amount of data correspond to different portions of data included in a load/store or other operation received by the reservation station.

The method further includes checking, by the reservation station, first characteristics of the first load/store operation (block 1203). In various embodiments, checking the first characteristics includes determining a number of sources in the first load/store operation, and determining if the first load/store operation is a load or a store operation.

The method also includes storing, by the reservation station, the first load/store operation in a particular secondary entry of the plurality of partial entries in response to determining that the first load/store operation includes a single-source load operation (block 1204).

In various embodiments, the method may further include requesting, by the reservation station, a credit associated with the plurality of partial entries, and storing, by the reservation station in response to receiving the credit, the first load/store operation in the particular secondary entry. In such cases, the method may also include releasing, by the reservation station, the credit in response to issuing the first load/store operation.

In some embodiments, the method may include receiving, by the reservation station, a second load/store operation, and checking, by the reservation station, second characteristics of the second load/store operation. The method may additionally include storing the second load/store operation in a particular primary entry of the plurality of primary entries in response to determining that the second load/store operation includes more than one source or is a store operation.

In some embodiments, the method may additionally include receiving a different load/store operation that includes a single source, and checking, by the reservation station, for an available credit associated with the plurality of partial entries. In such cases, the method may further include storing, by the reservation station in response to determining that no credits associated with the plurality of partial entries are available, the different load/store operation in a particular primary entry of the plurality of primary entries.

In other embodiments, the reservation station may include a secondary storage circuit. In such cases, the method may further include transferring, by the reservation station, a particular store operation from the primary storage circuit to the secondary storage circuit in response to determining that the particular store operation is delinquent.

The method concludes in block 1205. It is noted that the embodiment of the method depicted in FIG. 12 may be used in conjunction with any of the methods described in FIG. 6, 7, or 11.

Figure 13:
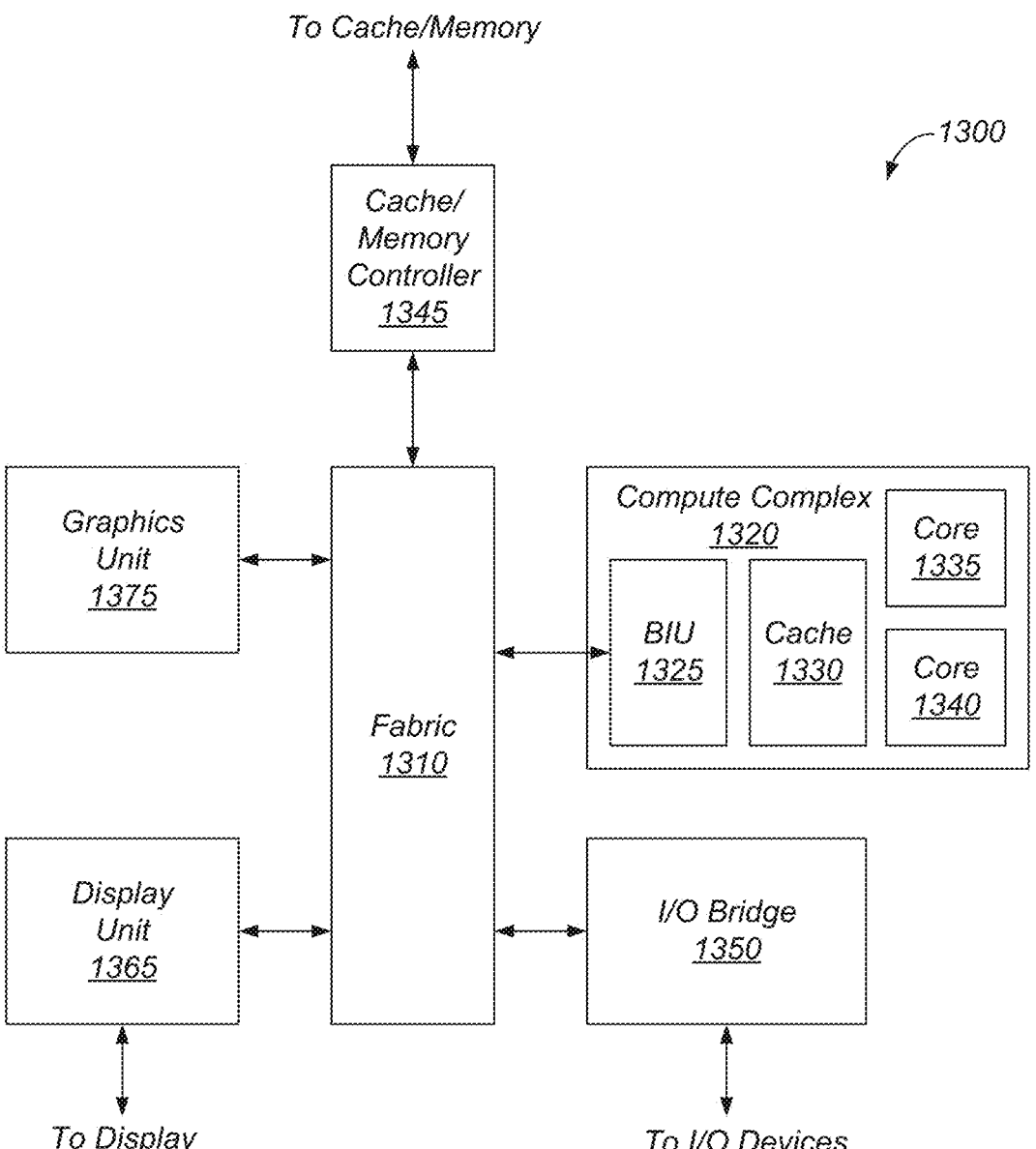
FIG. 13 is a block diagram of an embodiment of a device that includes a reservation station.

Referring now to FIG. 13, a block diagram illustrating an example embodiment of a device that includes a processor circuit that includes a reservation station, e.g., reservation station 100 and/or reservation station 800, is shown. In some embodiments, elements of device 1300 may be included within a system on a chip. In some embodiments, device 1300 may be included in a mobile device, which may be battery-powered. Therefore, power consumption by device 1300 may be an important design consideration. In the illustrated embodiment, device 1300 includes fabric 1310, compute complex 1320, input/output (I/O) bridge 1350, cache/memory controller 1345, graphics unit 1375, and display unit 1365. In some embodiments, device 1300 may include other components (not shown) in addition to, or in place of, the illustrated components, such as video processor encoders and decoders, image processing or recognition elements, computer vision elements, etc.

Fabric 1310 may include various interconnects, buses, MUX's, controllers, etc., and may be configured to facilitate communication between various elements of device 1300. In some embodiments, portions of fabric 1310 may be configured to implement various different communication protocols. In other embodiments, fabric 1310 may implement a single communication protocol, and elements coupled to fabric 1310 may convert from the single communication protocol to other communication protocols internally.

In the illustrated embodiment, compute complex 1320 includes bus interface unit (BIU) 1325, cache 1330, and cores 1335 and 1340. In various embodiments, compute complex 1320 may include various numbers of processors, processor cores, and caches. For example, compute complex 1320 may include 1, 2, or 4 processor cores, or any other suitable number. In one embodiment, cache 1330 is a set associative L2 cache. In some embodiments, cores 1335 and 1340 may include internal instruction and data caches. In some embodiments, a coherency unit (not shown) in fabric 1310, cache 1330, or elsewhere in device 1300, may be configured to maintain coherency between various caches of device 1300. BIU 1325 may be configured to manage communication between compute complex 1320 and other elements of device 1300. Processor cores such as cores 1335 and 1340 may be configured to execute instructions of a particular instruction set architecture (ISA) which may include operating system instructions and user application instructions. These instructions may be stored in a computer readable medium such as a memory coupled to cache memory controller 1345 as discussed below.

As used herein, the term "coupled to" may indicate one or more connections between elements, and a coupling may include intervening elements. For example, in FIG. 13, graphics unit 1375 may be described as "coupled to" a memory through fabric 1310 and cache/memory controller 1345. In contrast, in the illustrated embodiment of FIG. 13, graphics unit 1375 is "directly coupled" to fabric 1310 because there are no intervening elements.

Cache/memory controller 1345 may be configured to manage transfer of data between fabric 1310 and one or more caches and memories. For example, cache/memory controller 1345 may be coupled to an L3 cache, which may, in turn, be coupled to a system memory. In other embodiments, cache/memory controller 1345 may be directly coupled to a memory. In some embodiments, cache/memory controller 1345 may include one or more internal caches. Memory coupled to cache/memory controller 1345 may be any type of volatile memory, such as dynamic random access memory (DRAM), synchronous DRAM (SDRAM), double data rate (DDR, DDR2, DDR3, etc.), SDRAM (including mobile versions of SDRAMs such as mDDR3, etc., and/or low power versions of SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 1345 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1320 to cause the computing device to perform functionality described herein.

Graphics unit 1375 may include one or more processors, e.g., one or more graphics processing units (GPUs). Graphics unit 1375 may receive graphics-oriented instructions, such as OPENGL®, Metal®, or DIRECT3D® instructions, for example. Graphics unit 1375 may execute specialized GPU instructions or perform other operations based on the received graphics-oriented instructions. Graphics unit 1375 may generally be configured to process large blocks of data in parallel, and may build images in a frame buffer for output to a display, which may be included in the device or may be a separate device. Graphics unit 1375 may include transform, lighting, triangle, and rendering engines in one or more graphics processing pipelines. Graphics unit 1375 may output pixel information for display images. Graphics unit 1375, in various embodiments, may include programmable shader circuitry, which may include highly parallel execution cores configured to execute graphics programs, which may include pixel tasks, vertex tasks, and compute tasks (which may or may not be graphics-related).

Display unit 1365 may be configured to read data from a frame buffer and provide a stream of pixel values for display. Display unit 1365 may be configured as a display pipeline in some embodiments. Additionally, display unit 1365 may be configured to blend multiple frames to produce an output frame. Further, display unit 1365 may include one or more interfaces (e.g., MIPI® or embedded display port (eDP)) for coupling to a user display (e.g., a touchscreen or an external display).

I/O bridge 1350 may include various elements configured to implement universal serial bus (USB) communications, security, audio, and low-power always-on functionality, for example. I/O bridge 1350 may also include interfaces such as pulse-width modulation (PWM), general-purpose input/output (GPIO), serial peripheral interface (SPI), inter-integrated circuit (I2C), and radio-frequency interfaces, for example. Various types of peripherals and devices may be coupled to device 1300 via I/O bridge 1350.

In some embodiments, device 1300 includes network interface circuitry (not explicitly shown), which may be connected to fabric 1310 or I/O bridge 1350. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1300 with connectivity to various types of other devices and networks.

Figure 14:
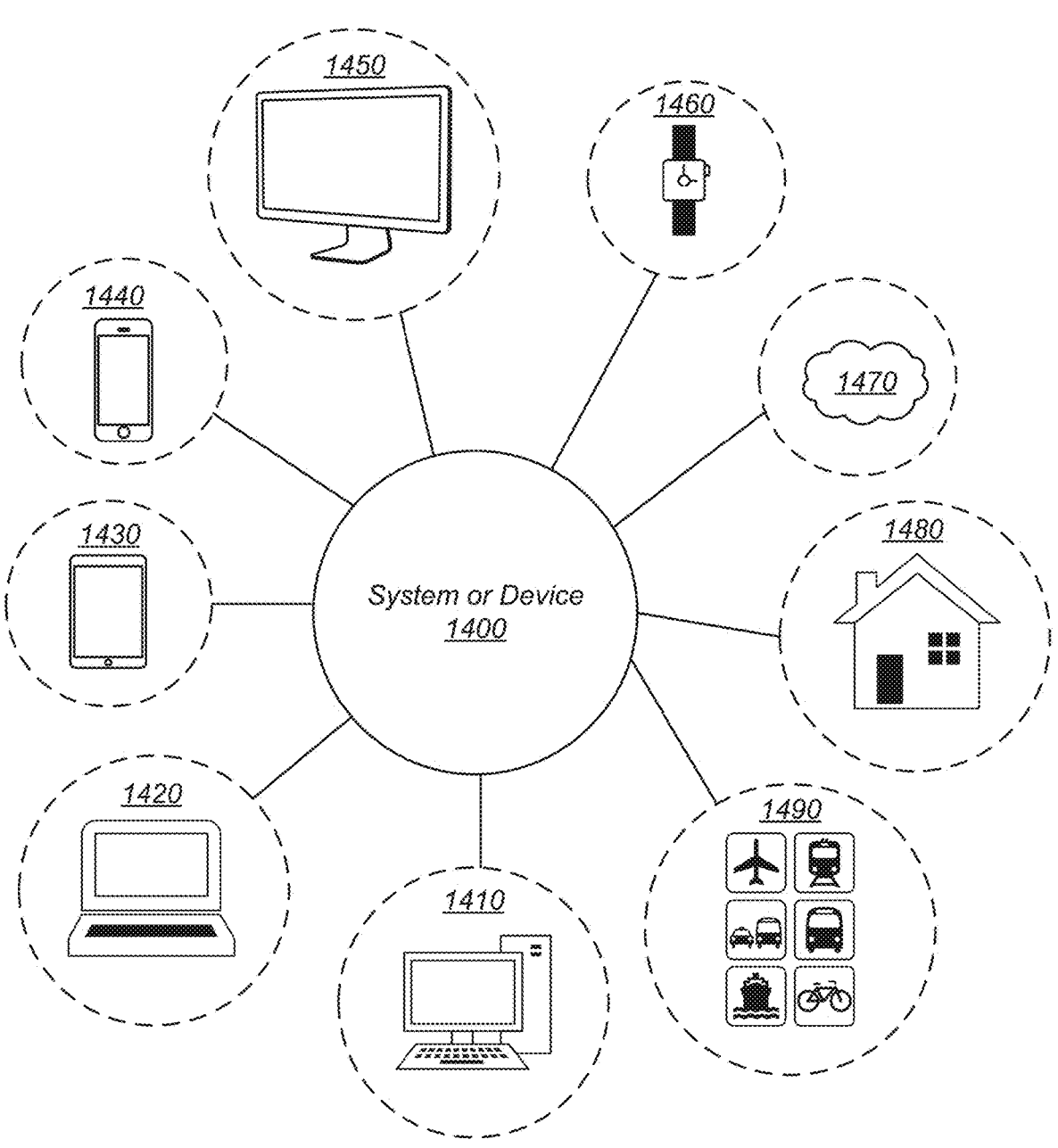
FIG. 14 is a block diagram of various embodiments of computer systems that may include power management circuits.

Turning now to FIG. 14, various types of systems that may include any of the circuits, devices, or system discussed above are illustrated. System or device 1400, which may incorporate or otherwise utilize one or more of the techniques described herein, may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 1470. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 15:
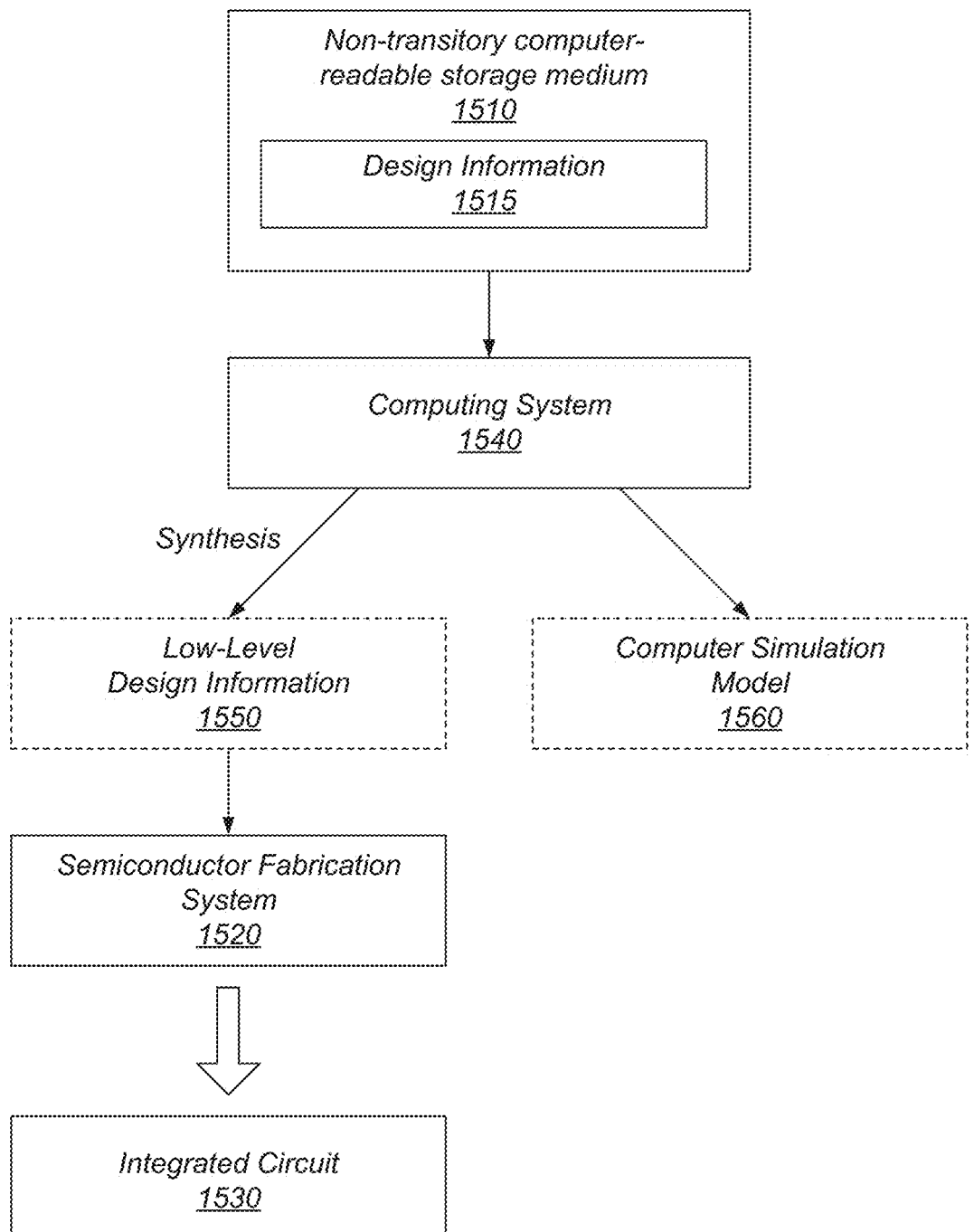
FIG. 15 illustrates an example of a non-transitory computer-readable storage medium that stores circuit design information.

FIG. 15 is a block diagram illustrating an example of a non-transitory computer-readable storage medium that stores circuit design information 1515, according to some embodiments. In the illustrated embodiment, computing system 1540 is configured to process design information 1515. This may include executing instructions included in design information 1515, interpreting instructions included in design information 1515, compiling, transforming, or otherwise updating design information 1515, etc. Therefore, design information 1515 controls computing system 1540 (e.g., by programming computing system 1540) to perform various operations discussed below, in some embodiments.

In the illustrated example, computing system 1540 processes design information 1515 to generate both computer simulation model 1560 of a integrated circuit 1530 and low-level design information 1550. In other embodiments, computing system 1540 may generate only one of these outputs, may generate other outputs based on design information 1515, or both. Regarding computer simulation model 1560, computing system 1540 may execute instructions of a hardware description language that includes register transfer level (RTL) code, behavioral code, structural code, or some combination thereof. The simulation model may perform the functionality specified by design information 1515, facilitate verification of the functional correctness of the hardware design, generate power consumption estimates, generate timing estimates, etc.

In the illustrated example, computing system 1540 also processes design information 1515 to generate low-level design information 1550 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 1550 (potentially among other inputs), semiconductor fabrication system 1520 is configured to fabricate integrated circuit 1530 (which may correspond to functionality of the computer simulation model 1560). Note that computing system 1540 may generate different simulation models based on design information at various levels of description, including low-level design information 1550, design information 1515, and so on. The data representing low-level design information 1550 and computer simulation model 1560 may be stored on non-transitory computer readable storage medium 1510, or on one or more other media.

In some embodiments, low-level design information 1550 controls (e.g., programs) semiconductor fabrication system 1520 to fabricate integrated circuit 1530. Thus, when processed by the fabrication system, the design information may program the fabrication system to fabricate a circuit that includes various circuitry disclosed herein.

Non-transitory computer-readable storage medium 1510 may comprise any of various appropriate types of memory devices or storage devices. Non-transitory computer-readable storage medium 1510 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1510 may include other types of non-transitory memory as well, or combinations thereof. Accordingly, non-transitory computer-readable storage medium 1510 may include two or more memory media; such media may reside in different locations—for example, in different computer systems that are connected over a network.

Design information 1515 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1540, semiconductor fabrication system 1520, or both. In some embodiments, design information 1515 may also include one or more cell libraries that specify the synthesis, layout, or both of integrated circuit 1530. In some embodiments, design information 1515 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1530 may, in various embodiments, include one or more custom macrocells, such as memories, analog or mixed-signal circuits, and the like. In such cases, design information 1515 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 and computer simulation model 1560 are configured to operate according to a circuit design specified by design information 1515, which may include performing any of the functionality described herein. For example, integrated circuit 1530 may include any of various elements shown in FIGS. 1 and 8. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 1515. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 1515 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 1550. Low-level design information 1550 may program semiconductor fabrication system 1520 to fabricate integrated circuit 1530.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

a primary storage circuit including a plurality of full entries and a plurality of partial entries, wherein a given full entry of the plurality of full entries is configured to store a first amount of data, and wherein a given partial entry of the plurality of partial entries is configured to store a second amount of data less than the first amount of data;

a secondary storage circuit, and a control circuit configured to:

receive a first load/store operation; and store the first load/store operation in a particular partial entry of the plurality of partial entries in response to a determination that the first load/store operation includes only a single source; and transfer a particular store operation from the primary storage circuit to the secondary storage circuit in response to a determination that the particular store operation is delinquent.

2. The apparatus of claim 1, wherein the control circuit is further configured to:

receive a second load/store operation; and store the second load/store operation in a particular full entry of the plurality of full entries in response to a determination that the second load/store operation includes more than one source.

3. The apparatus of claim 1, wherein to store the first load/store operation, the control circuit is further configured to:

check for an available credit; and in response to a determination that no credits are available, store the first load/store operation in a particular full entry of the plurality of full entries.

4. The apparatus of claim 1, wherein the primary storage circuit further includes a plurality of load-partial entries, wherein a given load-partial entry of the plurality of load-partial entries is configured to store a third amount of data less than the second amount of data, and wherein the control circuit is further configured to:

receive a second load/store operation; and in response to a determination that the second load/store operation is a single-source load operation, store the second load/store operation in a particular load-partial entry of the plurality of load-partial entries.

5. The apparatus of claim 4, wherein the control circuit is further configured to:

link a different full entry of the plurality of full entries to a different load-partial entry of the plurality of load-partial entries to form a pair entry; and store a third load/store operation in a portion of the pair entry in response to a determination that the third load/store operation has multiple sources and that there are no free full entries in the plurality of full entries.

6. The apparatus of claim 1, wherein to transfer the particular store operation, the control circuit is further configured to select an oldest delinquent entry of a plurality of delinquent entries.

7. A method, comprising:

receiving, by a reservation station, a first load/store operation, wherein the reservation station includes a primary storage circuit including a plurality of full entries, and a plurality of partial entries, wherein a given full entry of the plurality of full entries is configured to store a first amount of data, and wherein a given partial entry of the plurality of partial entries is configured to store a second amount of data less than the first amount of data, and wherein the reservation station further includes a secondary storage circuit;

checking, by the reservation station, first characteristics of the first load/store operation;

storing, by the reservation station, the first load/store operation in a particular partial entry of the plurality of partial entries in response to determining that the first load/store operation includes only a single source; and transferring a particular store operation from a particular full entry of the plurality of full entries to the secondary storage circuit in response to determining that a store address associated with the particular store operation has been available for use for a threshold number of cycles without store data associated with the particular store operation being available for use.

8. The method of claim 7, further comprising:

receiving, by the reservation station, a second load/store operation;

checking, by the reservation station, second characteristics of the second load/store operation; and storing the second load/store operation in a particular full entry of the plurality of full entries in response to determining that the second load/store operation includes more than one source.

9. The method of claim 7, further comprising:

receiving, by the reservation station, a second load/store operation that includes a single source;

checking, by the reservation station, for an available credit associated with the plurality of partial entries; and storing, by the reservation station in response to determining that no credits are available, the second load/store operation in a particular full entry of the plurality of full entries.

10. The method of claim 7, further comprising:

requesting, by the reservation station, a credit associated with the plurality of partial entries;

storing, by the reservation station in response to receiving the credit, the first load/store operation in the particular partial entry; and releasing, by the reservation station in response to issuing the first load/store operation, the credit.

11. The method of claim 7, wherein the primary storage circuit further includes a plurality of load-partial entries, wherein a given load-partial entry of the plurality of load-partial entries is configured to store a third amount of data less than the second amount of data, and further comprising:

receiving, by the reservation station, a second load/store operation; and storing, by the reservation station in response to a determination that the second load/store operation is a single-source load operation, the second load/store operation in a particular load-partial entry of the plurality of load-partial entries.

12. The method of claim 11, further comprising:

linking, by the reservation station, a different full entry of the plurality of full entries to a different load-partial entry of the plurality of load-partial entries to form a pair entry; and storing, by the reservation station, a third load/store operation in a portion of the pair entry in response to determining that the third load/store operation has multiple sources and that there is no free full entry in the plurality of full entries.

13. The method of claim 7, wherein transferring the particular store operation includes selecting an oldest delinquent entry of a plurality of delinquent entries.

14. A processor circuit, comprising:

a plurality of execution units; and a reservation station that includes a primary storage circuit that includes a plurality of full entries and a plurality of partial entries, wherein a given full entry of the plurality of full entries is configured to store a first amount of data, wherein a given partial entry of the plurality of partial entries is configured to store a second amount of data less than the first amount of data, wherein the reservation station further includes a secondary storage circuit, and wherein the reservation station is configured to:

receive a first load/store operation;

check first characteristics of the first load/store operation;

store the first load/store operation in a particular partial entry of the plurality of partial entries in response to a determination that the first load/store operation includes only a single source; and transfer a particular store operation from the primary storage circuit to the secondary storage circuit in response to a determination that a store address associated with the particular store operation has been available for use for a threshold number of cycles without store data associated with the particular store operation being available for use.

15. The processor circuit of claim 14, wherein the reservation station is further configured to:

receive a second load/store operation;

check second characteristics of the second load/store operation; and store the second load/store operation in a particular full entry of the plurality of full entries in response to a determination that the second load/store operation includes more than one source.

16. The processor circuit of claim 14, wherein the reservation station is further configured to:

receive a second load/store operation that includes a single source;

check for an available credit associated with the plurality of partial entries; and store the second load/store operation in a particular full entry of the plurality of full entries in response to a determination that no credits associated with the plurality of partial entries are available.

17. The processor circuit of claim 14, wherein the reservation station is further configured to:

request a credit associated with the plurality of partial entries;

store the first load/store operation in the particular partial entry in response to receiving the credit; and release the credit in response to issuing the first load/store operation to a given one of the plurality of execution units.

18. The processor circuit of claim 14, wherein the primary storage circuit further includes a plurality of load-partial entries, wherein a given load-partial entry of the plurality of load-partial entries is configured to store a third amount of data less than the second amount of data, and wherein the reservation station is further configured to:

receive a second load/store operation; and store the second load/store operation in a particular load partial entry of the plurality of load-partial entries in response to a determination that the second load/store operation is a single-source load operation.

19. The processor circuit of claim 18, wherein the reservation station is further configured to:

link a different full entry of the plurality of full entries to a different load-partial entry of the plurality of load-partial entries to form a pair entry; and store a third load/store operation in a portion of the pair entry in response to a determination that the third load/store operation has multiple sources and that there is no free full entry in the plurality of full entries.

20. The processor circuit of claim 14, wherein to transfer the particular store operation, the reservation station is further configured to select an oldest store operation from a plurality of store operations having corresponding store addresses that have been available for the threshold number of cycles.

* * * * *